Patented June 10, 1952

2,599,946

UNITED STATES PATENT OFFICE 2,599,946

OXIDATION INHIBITORS OF $U_3O_8$

Irving Sheft, Park Forest, and Sherman M. Fried, Chicago, Ill., assignors to the United States of America as represented by the United States Atomic Energy Commission No Drawing. Application March 13, 1950, Serial No. 149,446

4 Claims. (Cl. 23—14.5)

This invention relates to oxidation-resistant uranium oxide compositions wherein uranium atoms have a valence state lower than 6. This invention further relates to a process for effecting stabilization of the uranium atoms in uranium oxide compositions in a valence state lower than 6, and especially compositions containing $U_3O_8$.

Previous workers have stated that in the presence of oxygen at pressures of one atmosphere or less, the decomposition at temperatures above 470° C. of uranium trioxide ($UO_3$) to a lower oxide, which is intermediate uranyl uranate ($U_3O_8$) and uranium trioxide ($UO_3$), was irreversible. More recently, it was discovered, as shown in U. S. Patent 2,477,924 of Sherman M. Fried and Norman R. Davidson, and granted on August 2, 1949, that at temperatures between 450 and 750° C. and under an oxygen pressure between 20 and 150 atmospheres, the amorphous $U_3O_8$ could be transformed to $UO_3$.

While uranyl uranate, $U_3O_8$, has often been designated by the formula $UO_2.2UO_3$, this latter formula should not be construed to mean that there is more than one type of uranium atom in $U_3O_8$, because X-ray patterns for $U_3O_8$ show that all the uranium atoms in $U_3O_8$ occupy equivalent positions and thus carry the same average charge ($+5\frac{1}{3}$) which charge is maintained by resonance between the $U^{+4}$ valence and the $U^{+6}$ valence.

Since $UO_3$ is the most volatile of all oxides of uranium, the conversion of $U_3O_8$ to the higher and more volatile $UO_3$ under temperature conditions and atmospheric conditions favorable to oxidation, poses certain problems in industrial processes utilizing lower oxides of uranium, such as $U_3O_8$, which latter compound is frequently employed as catalyst or as a refractory. The problem presented by the oxidation of lower oxides of uranium and subsequent volatilization of the uranium as $UO_3$ is even more acute where lower oxides of uranium are employed as fuel in neutronic reactors wherein the conversion of $U_3O_8$ to the more volatile $UO_3$ and its subsequent loss by $UO_3$ volatilization is especially undesirable. In addition to the possible loss of uranium from neutronic reactors by oxidation to the more volatile uranium oxide, such oxidation with the accompanying volatilization also effects substantial migration of uranium as the volatile $UO_3$, thereby altering the distribution of uranium in the particular geometry necessary for a neutronic reactor.

It is thus an object of this invention to provide an oxidation-resistant uranium oxide composition wherein the average charge on the uranium atoms is less than 6 and the uranium atoms have a valence state lower than the hexavalent state of uranium as found in $UO_3$ and which lower valence uranium oxide composition is resistant to further oxidation even under conditions where oxidation of uranium ions to hexavalent uranium as in $UO_3$ would ordinarily occur.

A further object of this invention is to provide a method for inhibiting or at least retarding the oxidation of lower oxides of uranium, wherein the average valence state for the uranium atoms is less than 6, to the more volatile uranium trioxide.

A further object of this invention is to provide a process which will effect stabilization of uranium oxide compositions in a lattice form of a lower uranium oxide, i. e., a form wherein the uranium atoms favor oxidation states which are at least lower than 6.

Other objects and advantages will be apparent upon further examination of the present application.

We have discovered that oxidation of oxides of uranium wherein the valence state of the uranium is less than 6 is substantially retarded and inhibited by incorporating therewith oxides of heavy metals. We have found that oxides of iron, zirconium, gadolinium, manganese, silver, zinc, bismuth, and thorium inhibit oxidation of lower oxides of uranium; this effect is also observed, but only to a lesser extent, upon incorporation of the oxides of other metals, such as beryllium, within the uranium oxide crystal structure having uranium in a lower oxidation state. The amount of metal oxide or mixture of metal oxides incorporated in the lower uranium oxide compositions can be varied considerably and the preferred amount ranges between 0.1 and 5% by weight of metal, as the metal oxide, based upon uranium content.

Incorporation of only 0.1 weight per cent iron as iron oxide in $U_3O_8$ effectively retards oxidation; addition of zirconium as zirconium oxide to the extent of 13 weight per cent also prevents the oxidation of $U_3O_8$ to $UO_3$. Samples of compositions containing zirconium oxide and $U_3O_8$ remain unoxidized even after exposure to heat and superatmospheric pressures of oxygen for a period as long as 8 months. Even when these metal oxides are added to the extent of 26 atomic per cent of metal based upon uranium content, the resultant compositions exhibit a monophasic X-ray pattern similar to the pattern for $U_3O_8$. The composition containing added zirconium oxide has smaller lattice parameters indicative of replacement of uranium by zirconium in the $U_3O_8$ lattice.

The incorporation with lower uranium oxides of oxides of Fe, Be, Zn, and Bi results in oxidation-resistant compositions, which upon sufficient heating under oxygen pressure at high temperture produce compositions shown by X-ray diffraction to be diphasic. Regardless of the X-ray pattern of the resultant compositions, after oxidation the products effected by the incorporation of oxides of any of the aforementioned metals withstand complete oxidation even when heated in the presence of oxygen under superatmospheric pressures, and the amount of uranium lost by volatilization as a higher oxide is substantially reduced. The addition of oxidation-retardant metal oxides to the lower oxides of uranium also affects the physical properties of uranium oxide, for example, the addition of 4 atomic weight per cent metal as an oxidation-retardant metal oxide to $U_3O_8$ effects a softer and less dense composition than pure $U_3O_8$.

In accordance with the process of this invention, oxides of the oxidation-inhibiting metals are incorporated with lower uranium oxides by dissolving the desired proportion of the oxidation-inhibiting metal in the form of the metal oxide or salt, such as nitrate, in nitric acid along with dissolution of uranium or uranium compound. The nitric aci solutions may be prepared separately and mixed. The resultant solution is then evaporated to dryness and the residue ignited in air at an elevated temperature, e. g., 850° C. Alternatively, the lower uranium oxide is ground in a mortar together with the oxidation-retardant metal oxide and the comminuted oxides are intimately mixed by simple physical or mechanical means prior to firing at 850° C. in air.

The following examples are illustrative of the preparation of the oxidation-resistant compositions and their resistance to oxidation.

EXAMPLE I

A sample consisting of 0.05 g. of iron mixed with 6 g. of $U_3O_8$ was dissolved in nitric acid, evaporated, and ignited to oxide by heating at 850° C. Five-hundredths g. of beryllium was incorporated with 6 g. of $U_3O_8$ in an identical manner, while 6 g. of $U_3O_8$ without added metal was similarly treated to prepare a control. All three samples were placed in quartz reaction tubes and heated at 600° C. for about seventy-two hours under an oxygen pressure of approximately 380 lbs. X-ray analyses of the products showed that the control sample of $U_3O_8$ was completely converted to $UO_3$ while the X-ray pattern of the product formed from the sample containing beryllia contained 60% $UO_3$ and 40% $U_3O_8$, and the product formed from the sample containing iron oxide showed a diffraction pattern for $U_3O_8$ alone. The product formulae based upon the weight losses obtained by ignition in air of samples weighing approximately 1 g. each, were:

| | Observed Weight Losses | Formulae |
|---|---|---|
| | $Mg.$ | |
| For the control sample (1.10 g.) | 20.72 | $UO_{3.002}$ |
| For the sample containing beryllia (0.73 g.) | 11.63 | $UO_{2.953}$ |
| For the sample containing iron oxide (0.75 g.) | 6.18 | $UO_{2.815}$ |

EXAMPLE II

In order to determine the effect of various concentrations of iron upon $U_3O_8$ subjected to oxidizing conditions, sufficient iron was dissolved in nitric acid to effect an iron concentration therein of 1 mg./cc. A nitric acid solution of uranyl nitrate containing 100 mg./cc. of uranium was prepared. Mixtures of the iron nitrate solution and uranyl nitrate solutions were made to provide six solutions. These solutions and a 2-cc. sample of the uranyl nitrate solution were evaporated to dryness and the residue ignited. The ignited samples where heated for thirty-eight hours at 600° C. in presence of oxygen under 360 lbs. of pressure. X-ray analysis of the product and calculations of the formulae from the weight loss of samples of the product on ignition in air showed that the oxidation-inhibition of $U_3O_8$ in the samples was proportional to the amount of iron oxide present.

The data are as follows:

| Uranyl nitrate solution, cc. | Iron nitrate solution, cc. | Weight per cent iron in product (based on U) | Product as determined by— | |
|---|---|---|---|---|
| | | | X-ray pattern | weight loss on ignition |
| 2 | 0 | 0 | $UO_3$ | $UO_{2.992}$ |
| 2 | 0.002 | 0.001 | $UO_3$ | $UO_{2.998}$ |
| 2 | 0.02 | 0.01 | 60% $UO_3$–40% $U_3O_8$ | $UO_{2.995}$ |
| 2 | 0.1 | 0.05 | $UO_3$ | $UO_{2.964}$ |
| 2 | 0.2 | 0.1 | $U_3O_8$ | $UO_{2.849}$ |
| 2 | 1.0 | 0.5 | $U_3O_8$ | $UO_{2.793}$ |
| 2 | 2.0 | 1.0 | $U_3O_8$ | $UO_{2.752}$ |

EXAMPLE III

Several series of tests were run in which $U_3O_8$ or compositions containing $U_3O_8$ in combination with other metal oxides were prepared and subjected to oxygen pressure of 380 pounds in a bomb at a temperature range between 600 and 650° C. in the same manner as in Example I. The $U_3O_8$-containing compositions were prepared by dissolving $U_3O_8$ in nitric acid along with the dissolution of either a metal, a metal oxide or the metal nitrate. Specifically, zinc, bismuth, manganese, and iron were used as metal for the dissolution step, gadolinium was used as the oxide and zirconium and silver were used as nitrates. The resultant aqueous solutions of uranyl nitrate and other metal nitrate were heated for removal of water after which the residue was ignited for conversion to metal oxide composition in which uranium was present as $U_3O_8$. These compositions were subjected to the high temperature treatment under oxygen pressure as stated above using 6-g. quantities in some experiments and 1.2-g. quantities in other experiments. Samples of the products were examined by X-ray diffraction and the products were identified as shown below in the table which also presents the weight per cent of metal of other metal oxides in the compositions used for the high temperature oxygen treatment. In some cases the atomic per cent of the metal of the metal oxide inhibitor is also shown. Other samples of the products were ignited in air at an elevated temperature for conversion of any $UO_3$ produced to $U_3O_8$ whereby the chemical formulae were calculated. These formulae were in substantial agreement with the products as determined by X-ray analysis.

Table

METAL OF METAL OXIDE INCORPORATED

| Kind | Weight Per cent [1] | Atomic Per cent [1] | Product as Determined by X-ray pattern |
|---|---|---|---|
| None | | | $UO_3$. |
| Zn | 1.17 | 4.2 | 60% $UO_3$; 40% $U_3O_8$. |
| Bi | 3.74 | 4.2 | 8% $UO_3$; 92% $U_3O_8$. |
| Mn | .1 | | $U_3O_8$. |
| Gd | 0.33 | | $U_6O_{17}$. |
| Fe | 1 | 4.2 | 8% $UO_3$; 92% $U_3O_8$. |
| Ag | 1 | | $U_6O_{17}$. |
| Zr | 1.63 | 4.2 | $U_3O_8$. |
| Zr | 10 | | $U_3O_8$. |
| Zr | 13.3 | | $U_3O_8$. |

[1] Based on U content of product.

The foregoing data show how effectively the incorporation of these metal oxides inhibits the oxidation of lower uranium oxides such as $U_3O_8$.

The foregoing examples of the process of the present invention and the compositions prepared thereby are intended to be illustrative rather than limiting in scope. The numerous equivalents and modifications thereof, apparent to those skilled in the art, are included within the scope of the present invention. The appended claims are intended to cover as broadly as possible, in view of the prior art, all those features of novelty disclosed herein, taken either singly or in combination, and only the limitations shown in the appended claims are to be imposed upon the scope encompassed by this invention.

What is claimed is:

1. An oxidation-resistant composition comprising an oxide of uranium wherein the valence of the uranium atoms is less than 6 and at least 0.1% by weight, based upon uranium content, of iron as iron oxide.

2. A process for inhibiting oxidation of uranium oxides wherein the valence of the uranium atom is less than 6, comprising intimately mixing with said uranium oxides about 1 weight per cent of iron as iron oxide, based upon uranium content, and igniting the mixture in air.

3. A process for the preparation of an oxidation-resistant composition containing a major proportion of an oxide of uranium wherein the valence of the uranium atoms is less than 6, which comprises providing an aqueous solution containing uranyl nitrate and nitrate of iron sufficient to provide between 0.1 and 5% by weight of iron as iron oxide based upon the uranium content, evaporating for removal of water to provide a residue, igniting the residue in air at an elevated temperature to provide said oxidation-resistant composition.

4. The process of claim 3 wherein the amount of iron oxide is 1 per cent by weight of iron based upon uranium content.

IRVING SHEFT.
SHERMAN M. FRIED.

REFERENCES CITED

The following references are of record in the file of this patent:

UNITED STATES PATENTS

| Number | Name | Date |
|---|---|---|
| 1,837,254 | Dew | Dec. 22, 1931 |
| 2,415,878 | Hale | Feb. 18, 1947 |